United States Patent
Abbasi et al.

(10) Patent No.: US 12,360,966 B2
(45) Date of Patent: Jul. 15, 2025

(54) METHOD OF PROCESSING DATA TO BE WRITTEN TO A DATABASE

(71) Applicant: SingleStore, Inc., San Francisco, CA (US)

(72) Inventors: Huzaifa Abbasi, Seattle, WA (US); Evan Bergeron, Lakewood, WA (US); Zhou Sun, San Francisco, CA (US); Szu-Po Wang, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 168 days.

(21) Appl. No.: 17/532,752

(22) Filed: Nov. 22, 2021

(65) Prior Publication Data
US 2023/0161744 A1    May 25, 2023

(51) Int. Cl.
G06F 16/215    (2019.01)
G06F 16/22     (2019.01)
G06F 16/245    (2019.01)

(52) U.S. Cl.
CPC ........ *G06F 16/215* (2019.01); *G06F 16/2255* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 6,292,795 B1 * | 9/2001 | Peters | G06F 16/9017 707/999.005 |
| 8,874,842 B1 * | 10/2014 | Kimmel | G06F 3/0665 711/100 |
| 2014/0129757 A1 * | 5/2014 | Lo | G06F 12/023 711/E12.008 |
| 2014/0222768 A1 * | 8/2014 | Rambo | G06F 16/2282 707/756 |
| 2020/0192899 A1 * | 6/2020 | Joshi | G06F 16/24552 |
| 2021/0089537 A1 | 3/2021 | Hanson et al. | |

OTHER PUBLICATIONS

"Eamonn Keogh"; "Exact indexing of dynamic time warping"; 2004; Springer-Verlag London Ltd; pp. 1-29.*
Jun Wang; Learning to Hash for Indexing Big DataVA Survey; IEEE; 2016; pp. 34-57.*

* cited by examiner

Primary Examiner — Ann J Lo
Assistant Examiner — Jermaine A Mincey
(74) Attorney, Agent, or Firm — BIP US LLP (57) ABSTRACT

In some examples there is disclosed a computer-implemented method comprising providing an upper index having derived values corresponding to unique key values contained in a columnstore used to store at least part of a database. It may then be determined whether there is a duplicate in the database of the unique key value of the data to be written by querying the upper index for the unique key value and, in response to the upper index having a duplicate derived value, identifying a lower index and a position within the lower index, wherein the lower index is associated with at least part of a column of the columnstore, and querying the lower index to determine whether a unique key value corresponding to the position matches the unique key value of the data to be written.

16 Claims, 8 Drawing Sheets

METHOD OF PROCESSING DATA TO BE WRITTEN TO A DATABASE

BACKGROUND

Technical Field

The present application relates to database processing and, more specifically, methods and systems for duplicate checking of unique keys.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to carry out transactional or analytical processing by submitting a "query" or calling one or more functions in a query language for searching, organizing, retrieving and/or manipulating information stored within a respective database.

Certain database table or record set structures, also known as access methods, are designed to store data in accordance with how the data is going to be used. Two examples of different database access method designs are rowstore tables and columnstore tables. Typically, rowstore tables are used for online transaction processing (OLTP) workloads and columnstore tables are used for online analytical processing (OLAP) workloads. However, sometimes both transactional processing and analytical processing are required.

SUMMARY

According to a first aspect of the present disclosure there is provided a computer-implemented method of processing data associated with a unique key value to be written to a database. The method comprises providing an upper index having derived values corresponding to unique key values contained in a columnstore used to store at least part of the database and determining whether there is a duplicate in the database of the unique key value of the data to be written. This is determined by querying the upper index for the unique key value of the data to be written and, in response to the upper index having a derived value corresponding to the unique key value, identifying a lower index and a position within the lower index, wherein the lower index is associated with at least part of a column of the columnstore, and querying the lower index using the position to determine whether a unique key value corresponding to the position matches the unique key value of the data to be written. Processing the data then depends on the determination.

Using a two-level secondary indexing structure for unique keys in a columnstore improves the efficiency of handling database transactions that may impact on these unique keys. This enables for example rapid duplicate checking of unique keys associated with data to be written to the database. This can be handled directly in columnstore storage by checking the secondary indexing structures to determine whether a new unique key value to be inserted already exists in the database. If a duplicate is found, suitable processing for the duplicate unique key value can then be performed, which will depend on the query shape and configuration of the database management system. This improves the speed of duplicate unique key value checking and handling. Handling this in columnstore storage avoids the cost of duplicating and synchronising data across transactional and analytical storage, resulting in simplified database architecture to handle both transactional and analytical processing efficiently. When processing batches of data to be written into the database, a batch lookup of the secondary indexing structure can be performed quickly and efficiently.

BRIEF DESCRIPTION OF THE DRAWINGS

Various features of the present disclosure will be apparent from the detailed description which follows, taken in conjunction with the accompanying drawings, which together illustrate, features of the present disclosure, and wherein.

DETAILED DESCRIPTION OF CERTAIN EMBODIMENTS

Figure 1:
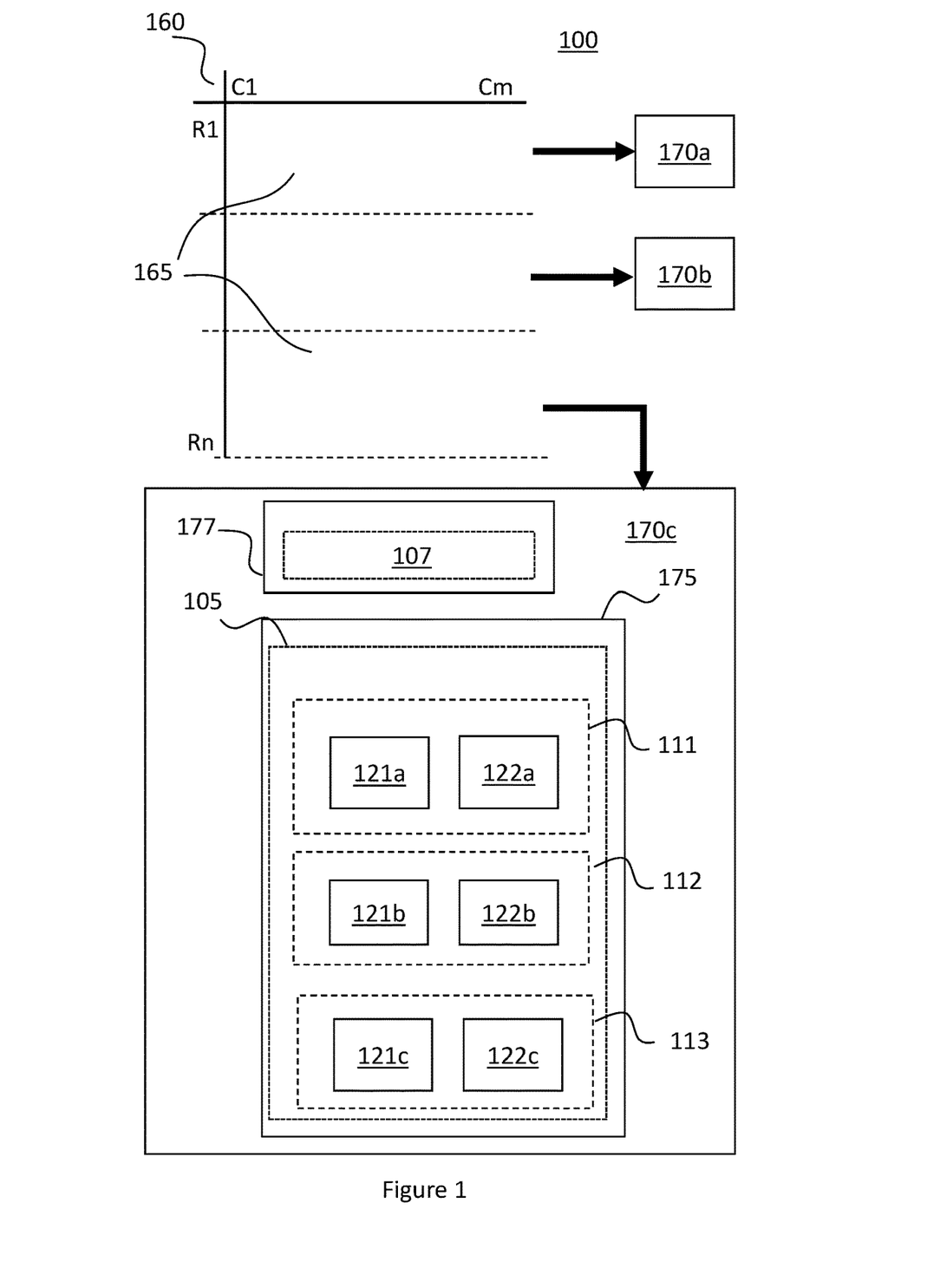
FIG. 1 is a schematic diagram illustrating storage of a table in a distributed database, according to an example.

FIG. 1 shows an example distributed database 100 according to embodiments in which a table 160 having data elements arranged in columns C1-Cm and rows R1-Rn is stored across a plurality of nodes 170a-170c. Node 170c is shown in more detail. The number of columns m may be in the order of 10-1000 and the number of rows n may be in the order of 1 million to 1 trillion. The table 160 may be distributed or sharded horizontally in which data elements from subsets of rows 165 and all columns C1-Cm are stored in respective nodes 170a-170c. Each node 170c may comprise volatile memory 177 such as RAM (Random Access Memory) and persistent storage 175 such as magnetic disk storage.

Data from database table(s) stored on a node 170a-170c may be moved between memory 177 and storage 175 depending on how new data is added, existing data is updated or manipulated, as well as various database maintenance procedures. Data in memory 177 may be stored in a rowstore 107 in which data elements of each row are grouped together prior to data elements of the next row following. Such a format is useful for inserting and updating rows. Data stored in storage 175 may be stored in a columnstore (sometimes referred to as a "column-oriented table") in which data elements of each column are stored consecutively. This type of storage enables fast searching. Data stored in the columnstore is typically encoded and compressed to efficiently store large amounts of data and will also be associated with indexes and other data structures to enable finding the data.

The columnstore 105 may be divided into segments 111, 112, 113 each comprising data elements from all columns and a subset of the rows stored on the node. For example, each column of a segment may comprise data elements from in the order of 100 million rows. Data elements from columns of the segment are encoded and compressed and stored as a file known as a columnstore file or blob on the storage 175. For example, blobs 121a and 122a may correspond to columns C1 and C2 of the row subset Ri-Rj in the segment 111 of node 170c. Blobs 121b, 122b of segment 112, and blobs 121c, 122c may correspond to the same columns C1 and C2 but different non-overlapping subsets of rows. Writing new data to a columnstore 105 may involve creating new segments with respective blobs. Where this operation changes existing data, the existing blobs containing the existing data may have rows marked as inactive or redundant, with the current version of the data being stored in the new blobs. This approach is more efficient than decompressing and decoding existing blobs to update the data there.

Prior to writing to blobs, the data to be stored in the columnstore may be sorted by a sort key on one of the columns. For example, column C5 may comprise Last.Name values of an employee table and may be sorted in alphabetical order. Secondary indexes may be generated for values in other columns in order to enable fast searching for those values. A unique key may contain one or more columns. The value of each data element in the column (or pairs or combinations of values in multiple columns for tuple unique keys) throughout the table will be unique. More than one unique key may be defined. For example, column C1 (blobs 121a-121c) may comprise EmployeeID which is a numerical value that is not repeated in any blob 121a, columnstore 105, rowstore 107 or on any other node 107a, 107b of the database. The unique key may comprise more than one column, in which case each combination of data elements in those columns must have a unique value.

Whilst for simplicity only two blobs per segment 111, 112, 113 and only three segments are shown, it will be appreciated that many blobs per segment may be required to store the table 160, and any number of segments may be utilized. The particular configuration of blobs or columnstore files and their size may be dependent on the hardware used and the database management configuration. It will also be appreciated that the database be stored on only a single node rather than distributed across many nodes.

Figure 2:
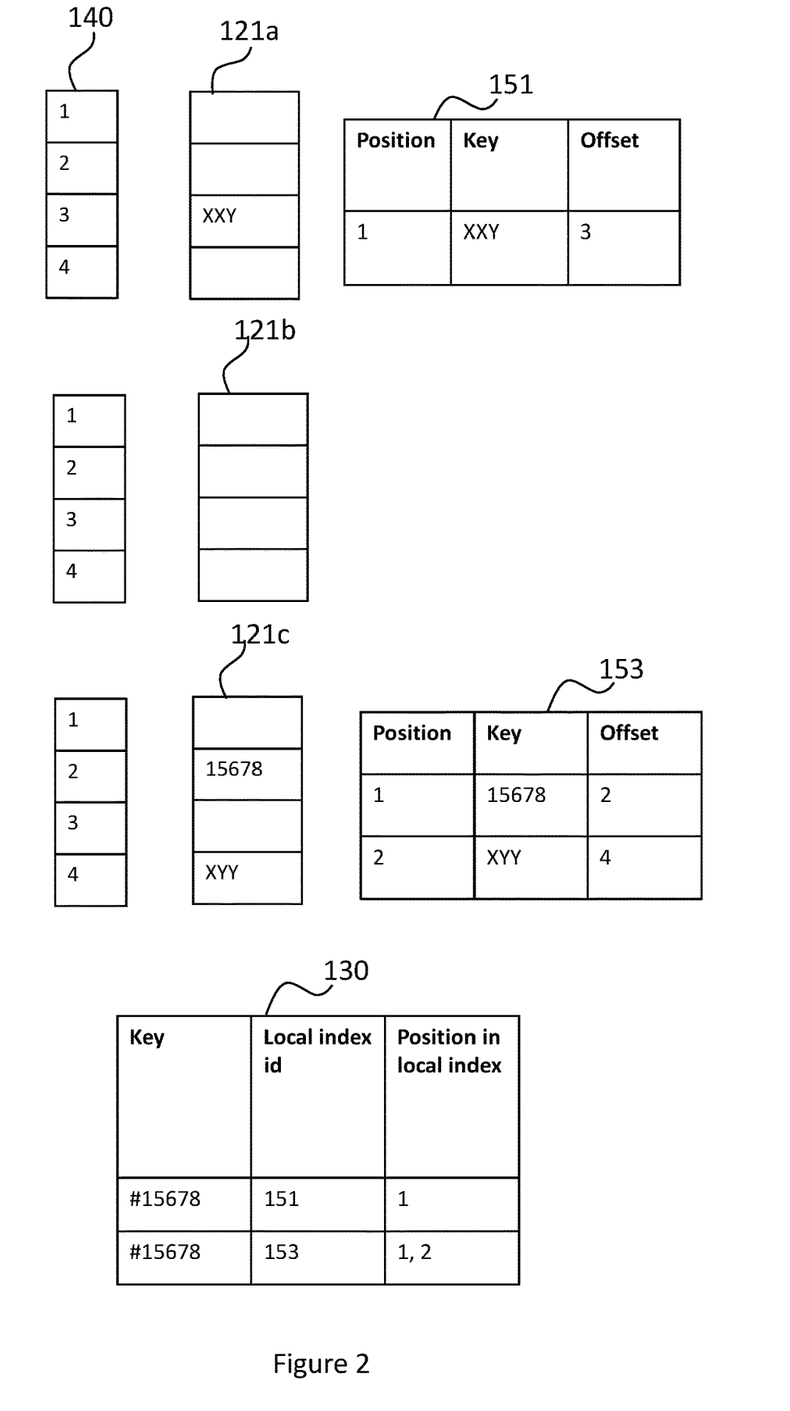
FIG. 2 is a schematic diagram illustrating an upper index and lower indexes for a unique key column in a columnstore, according to an example.

FIG. 2 shows a two-level unique key indexing structure for the columnstore 105, and comprises an upper index 130 and a plurality of lower or blob indexes 151-153. Each blob 121a, 121b 121c of the unique key column has an associated lower or blob index 151 and 153 (only two are shown for simplicity). These include a unique key value associated with an offset within the column blob where the unique key value can be found. Depending on the particular index structure, the unique key value may alternatively be associated with a position within the lower index and/or blob which points to the unique key values and associated offset within the blob.

Row numbers for each blob 121a— 121c are shown in 140 for illustrative purposes, although it will be appreciated that quickly identifying offsets to column values will be implemented using seekable column encodings. This may enable data elements from different columns but which correspond to the same row to be quickly identified, even though they may have a different offset within their respective blob due to different encoding and/or compression.

A small number of unique key values are shown, for example XXY at position or offset 3 within the first blob 121a. Blank entries in each column are simply used to represent entries that are not referred to in the example of FIG. 2, rather than empty or null values. Two other unique key values are shown, 15678 and XYY. XXY and XYY are indicative of numerical values different from 15678. Lowerindex 151 corresponds to blob 121a and indicates that value XXY is located at offset value 3 within the blob 121a. Lower index 153 corresponds to blob 121c and indicates the offsets of unique key values 15678 and XYY in blob 121c. It will be appreciated that each lower index will contain many more unique key value location entries though these are not shown for simplicity.

The two-level (upper and lower) index structure also comprises an upper index 130, which points to entries in the lower indexes 151-153. The upper index 130 comprises hashes of unique key values which are associated with locations within lower indexes where corresponding unique key values can be found. Hashes of unique key values are used as these are very fast to access, however, with low probability, two distinct unique key values may have the same hash, so the lower indexes pointed to also need to be queried in order to determine whether the unique key value exists. For example, the hash value of 15678 (#15678) may correspond to three locations within lower indexes. This is because #15678 may be the same as the hash of other values such as XXY and XYY. This hash value #15678 is mapped in the upper index 130 to position 1 in lower index 151 and positions 1 and 2 in lower index 153.

Upon checking position 1 of lower index 151, the value XXY is found, in other words value 15678 is not in blob 121a. Upon checking position 1 of lower index 153, value 15678 is found and is located at offset 2 in blob 121c. The hash value also maps to value XYY at position 2 of the lower index 153.

In an alternative arrangement, instead of mapping to the position value in the lower indexes, the upper index 130 may include offset values for each lower index so that these can be queried directly rather than querying the position then checking the associated offset. It is also noted that the columnstore may include more than one upper index. For example, an upper index may be associated with each blob and lower index, or with a group of even all blobs and corresponding lower indexes. In another arrangement, an upper index may be created, together with blobs and respective lower indexes, whenever a large batch of data is written to the columnstore.

Figure 3:
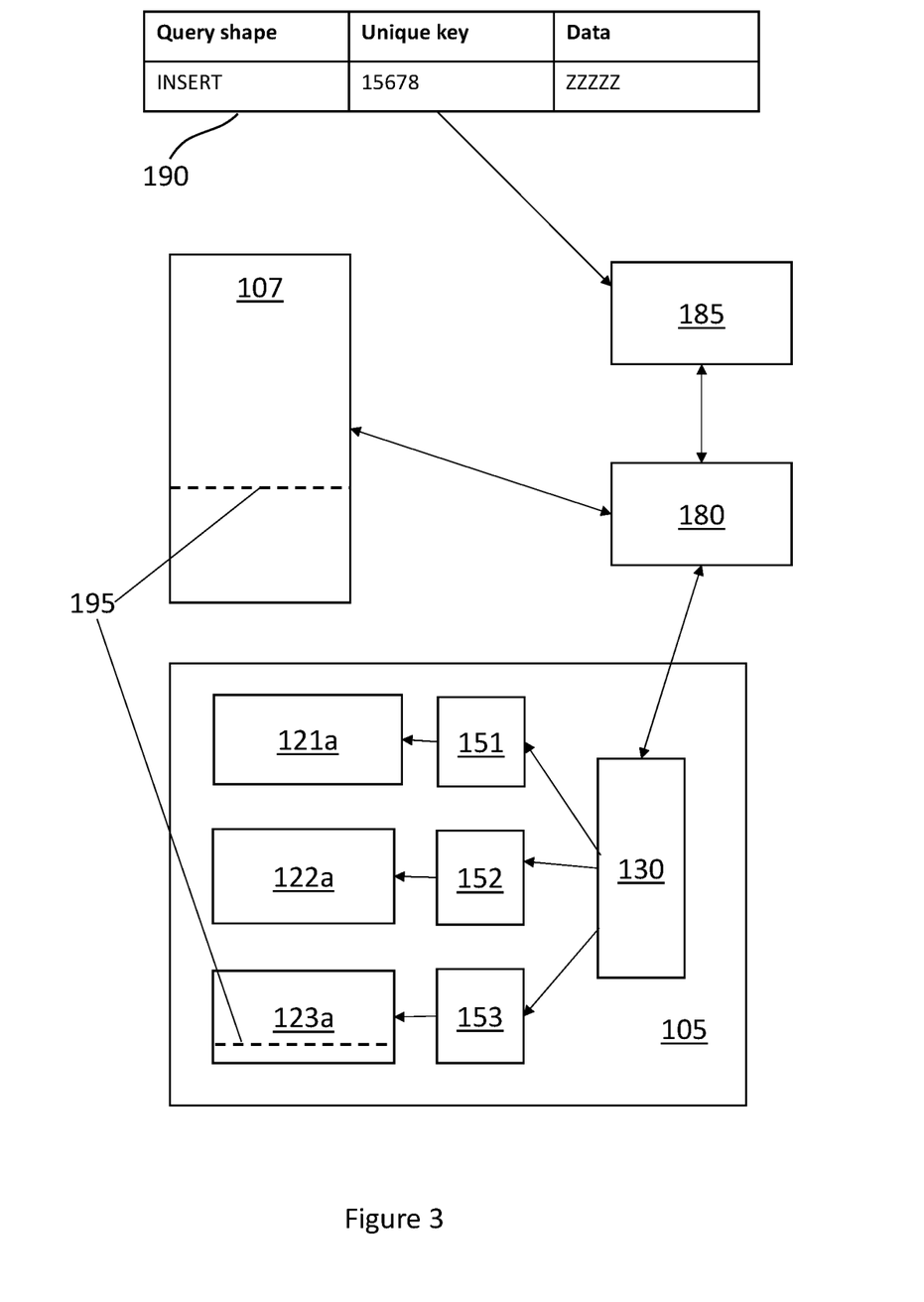
FIG. 3 is a schematic diagram illustrating functional components involved in unique key value duplicate checking for a query, according to an example.

FIG. 3 illustrates example components involved in checking for duplicate unique key values. Data may be added to the database using a query 190 and with at least one unique key value (eg 15678) and associated (non-unique) data (ZZZZZ). The query may attempt to write a single row or a batch of rows that may comprise, for example, millions of rows. The query may also be associated with a particular query shape, such as INSERT, INSERT IGNORE, REPLACE, or UPSERT. INSERT attempts to write data associated with a unique key value to the database, for example one or more rows of data elements, each row being associated with a unique key value. If the database already comprises the same unique key value, that is there is a duplicate unique key value, then attempting to write data with the same unique key values results in an error. INSERT IGNORE instructs different handling of data to be written which is associated with duplicate unique key values. Any rows having a unique key value that already exists in the database is ignored for the purposes of writing the data. REPLACE instructs the deletion of existing data in the database with a duplicate unique key value, and its replacement with data in the query. UPSERT instructs replacing or updating of data in the database that is associated with a duplicate unique key value with the data in the query. Other query shapes are also possible, for example data in the database associated with unique key values of the query may be modified.

Many queries may attempt to write data to the database concurrently. A lock table 185 is used to ensure that any unique key values associated with a query are marked as locked in the table so that other queries first check this table and so not attempt to also write data associated with these unique key values at the same time. The data in the database is locked by unique key value rather than by segment containing the unique key value as this allows other queries to also write data associated with a different unique key value in the same segment. This significantly improves concurrent access to the database when writing data, and hence query processing speed.

A duplicate checking function 180 is arranged to check the columnstore 105 and rowstore 107 for any duplicate unique key values, that is unique key values in the query data that already exist somewhere in the database table. Where the database is distributed, the query will be split into sharded parts each containing a subset of rows which are forwarded to respective nodes for processing. This means that all duplicate processing can be performed within each respective node and no inter-node checking is required. The rowstore 107 may be checked for duplicate unique key values by probing the unique key column for unique key values in the query data, or an index for this column. The columnstore may be checked for duplicate unique key values using the two-level index structure. The query data may also be checked for duplicate unique key values within the query data itself. As a query may write multiple batches of rows to the columnstore, earlier batches written to the columnstore as blobs, may later be checked for duplicate key values with later batches in the same query using the two-level index structure.

Figure 4:
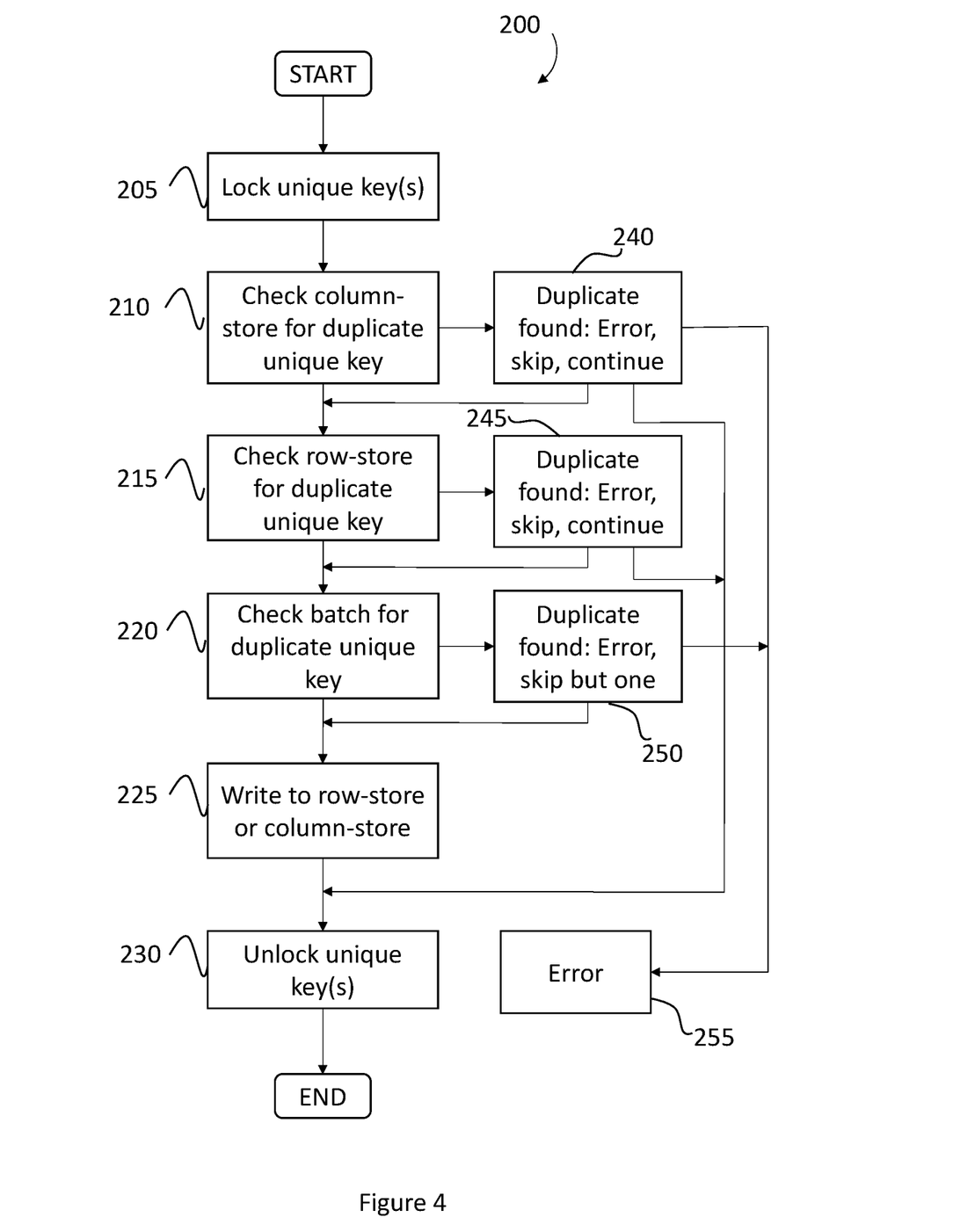
FIG. 4 is a flow chart of a method of unique key value duplicate checking of a database, according to an example.

FIG. 4 shows an example method 200 of checking for duplicate unique key values when writing data to a database. When the data is ready for writing, for example a write query is received, the method at 205 locks all unique key values in the database that correspond with the data to be written. This may involve first querying a lock table to determine whether the (or each) unique key value is already locked by another process; available keys may then be locked. If one or more unique key values are already locked, the query waits for those unique key values to be unlocked, or times out. By locking the unique key values, this prevents any concurrent processes from trying to write data elements in rows containing these unique key values.

At 210, the method checks the columnstore for duplicate unique key values. This process is described in more detail with respect to FIG. 5 below. If a duplicate key is not found, the method moves to 215.

If a duplicate unique key value is found in the columnstore, the method moves to duplicate processing or handling at 240. The particular action taken may depend on the query shape. For example, an INSERT query where a duplicate unique key value is found will result in an error process 255, such as an error notification to the user (Error). INSERT IGNORE may result in the method moving to 230 at the end of the process where the key is unlocked, and without having written conflicting data to the database (skip). REPLACE may result in deleting the duplicate row and continuing with the duplicate checking and writing processing (Continue). UPSERT may result in updating the row to be inserted using the duplicate row (Continue). In these "Continue" cases, rows to be skipped may be marked as "invalid" or similar. In the "Continue" cases, the method moves to 215. Logical rearrangement of rows may occur as part of a query, for example REPLACE/UPSERT may delete/update the existing duplicate rows in the table, and a logical rearrangement could happen as part of the delete/update (rows may be moved to the rowstore segment first before deleting/updating those rows). At 215, the method checks the rowstore for duplicate unique key values. This may involve probing a unique key index or the table itself if not too large. If a duplicate unique key value is not found in the rowstore, the method moves to 220.

If a duplicate unique key value is found in the rowstore, the method moves to duplicate processing or handling at 245. The particular action taken may depend on the query shape. For example, an INSERT query where a duplicate unique key value is found will result in an error process 255, such as an error notification to the user (Error). INSERT IGNORE may result in the method moving to 230 at the end of the process where the unique key value is unlocked, and without having written any data to the database (skip). REPLACE and UPSERT may result in continuing with the duplicate checking and writing processing (Continue). In this case the method moves to 220.

At 220, the method checks the batch or query data for duplicate keys. This may occur for example if there has been an error in preparing data to be written to the database. If a duplicate key is not found, the method moves to 225.

If a duplicate unique key value is found in the query data, the method moves to duplicate processing or handling at 250. The particular action taken may depend on the query shape. For example, an INSERT query where a duplicate unique key value is found will result in an error process 255, such as an error notification to the user (Error). INSERT IGNORE may result in the last row(s) containing the duplicate unique key value being skipped within the batch and only the first row containing the duplicate unique key value being used to write to the database (continue). By contrast a REPLACE query may result in all rows sharing the same unique key value being skipped except the last row. Similarly, an UPSERT query may result in all rows sharing the same unique key value being skipped except the last row, where the last row is updated according to the earlier rows. In the cases of INSERT IGNORE, REPLACE and UPSERT, the method moves to 225. Rows to be skipped may be marked as "invalid" in the batch.

At 225, the method writes the query data to the database. Any query data marked as "invalid" from the batch duplicate processing is ignored or skipped. Single rows or small batches of query data may be written to the rowstore. Large batches of data may be written directly to the columnstore. Once the query data is written to the database, the method moves to 230 where the unique key values are unlocked in the lock table 185.

Figure 5:
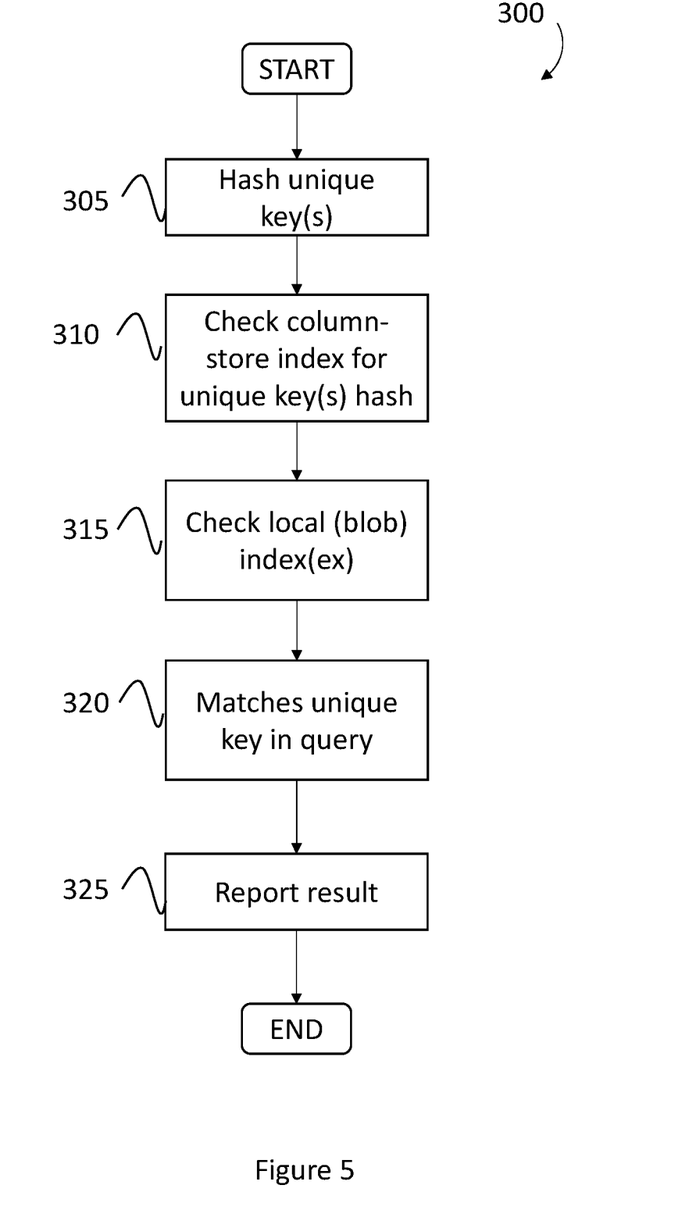
FIG. 5 is a flowchart of a method of using a two-level secondary index for duplicate checking of a columnstore, according to an example.

FIG. 5 illustrates a method 300 of checking for a duplicate key in a columnstore, for example when attempting to write data including a unique key value which already exists in the columnstore. At 305, the method calculates a hash of the unique key value in the query data.

At 310, the method checks an upper index (or all upper indexes if more than one) for the unique key value hash. This involves probing the upper index 130 for entries having the obtained hash; that is looking up one location in the index rather than scanning the entire index for example. Each such entry will correspond to a lower index identifier and a position within the lower index. For example, referring to FIG. 2, the hash of unique key value 15678 may correspond to an entry in lower index 151 at position 1 as well as entries in lower index 153 at positions 1 and 2.

At 315, the method checks each lower index and position corresponding to the hash of the unique key value in the query data. For example, referring again to FIG. 2, position 1 in lower index 151 is checked and which is associated with unique key value XXY. Therefore, this does not correspond to a duplicate of the unique key value associated with the query data. Positions 1 and 2 in the lower or blob index 153 correspond to unique key values 15678 and XYY. Therefore, the columnstore contains a duplicate of the unique key value in the query data.

At 320 the method checks whether the unique key values at the lower index positions match the unique key value in the query data. In this example, there is a match in lower index 153 at position 2.

At 325 the method reports the result, in this example that the columnstore contains a duplicate unique key value with the query data. Duplicate processing may then be undertaken as previously described.

For large batches of data to be written, checking for duplicate keys associated with a plurality of rows in the data to be written may be performed as a batch process. For example, the hashes of all the unique key values associated with the batch data are determined together, and the upper index(es) is probed for all of these hashes in one probing process. Each lower index pointed to by one or more upper index entries may then be probed for all corresponding unique key values at the same time, rather than probing these indexes separately (or scanning the entire index) for each duplicate key. This batch processing significantly boosts performance for large batches of data to be written to the database.

Figure 6:
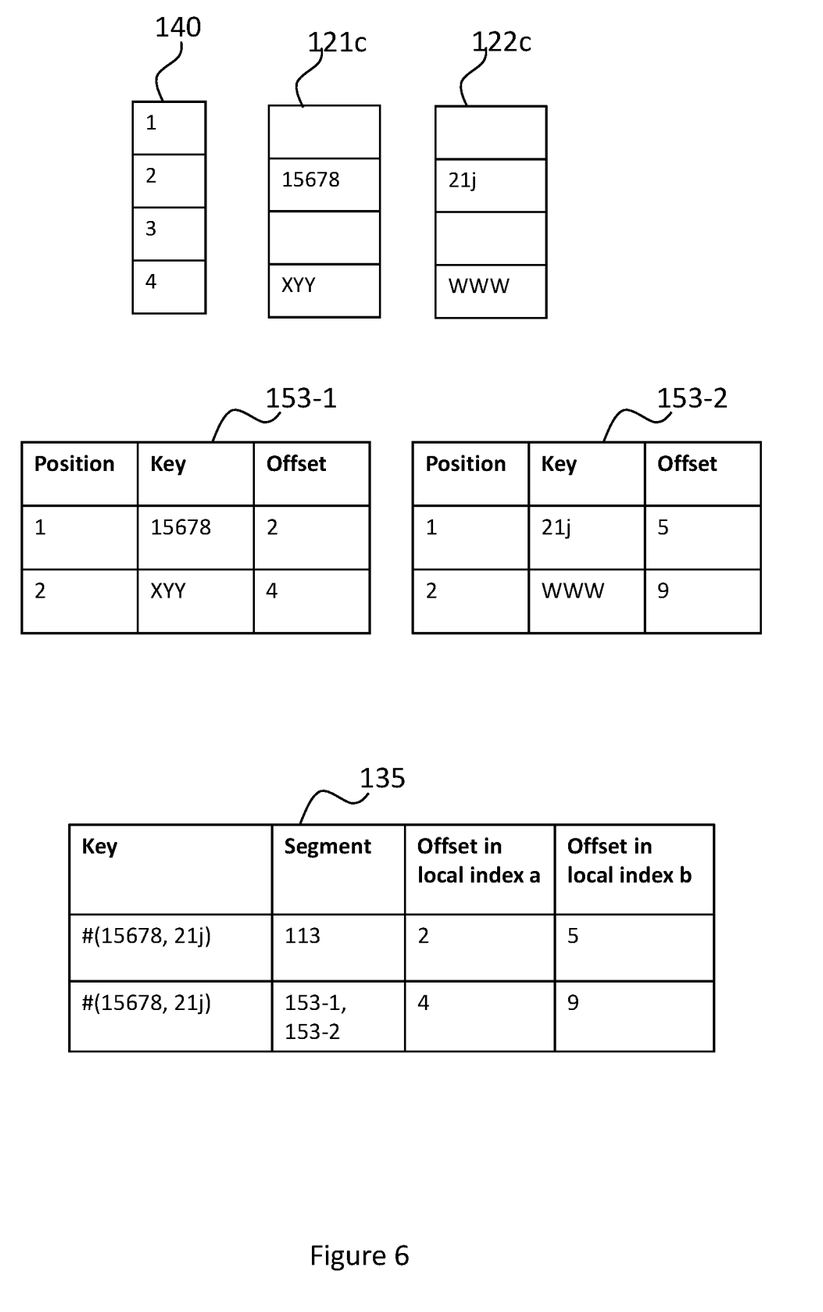
FIG. 6 is a schematic diagram of a multi-column unique key columnstore and corresponding local and upper indexes, according to an example.

FIG. 6 illustrates a multi-column unique key arrangement in which the unique key values are a combination of data element values in two (or more) columns. There may be repeated values in either column, but each combination of column values is unique. For simplicity, only two blobs 121a and 122a for a multicolumn unique key are shown and for only one segment. Two unique key values are illustrated: 15678, 21j and XYY, WWW.

Each blob has a corresponding blob or lower index—lower index 153-1 corresponds to blob 121c and lower index 153-2 corresponds to blob 122c. The unique key value 15678, 21j is indexed at positions 1 in both lower indexes and blob offset 2 and 5 respectively.

A multi-column upper index 135 points to these positions, or offsets in each lower index associated with the unique key columns. For simplicity, the upper index example shown corresponds to only one segment. The upper index contains hash values for the various unique key values and as explained previously some hash values for different unique key values may be the same. The hash for unique key tuple values 15678, 21j is illustrated as #(15678, 21j) and is associated with a segment identifier 113 together with offsets in each lower index associated with the multiple unique key blobs. In this example, the hash value corresponds to entries in lower index 153-1 at offsets 2 and 4, as well as lower index 153-2 at offsets 5, 9. In alternative arrangements, lower index positions rather than offsets may be employed as pointers within the upper index. In another alternative, the segment identifier may be replaced with identifiers for each lower index of the blobs associated with the multi-column unique key tuple values.

The first entry #(15678, 21j) in the upper index 135 points to offset 2 in lower index 153-1 for blob 121c in the first column of the unique key tuple and to offset 5 in lower index 153-2 for blob 122c in the second column of the unique key tuple. This corresponds to the multi-column unique key tuple 15679, 21j. The other entry for the hash of the unique key tuple 15678, 21j in the upper index 135 corresponds to XYY, WWW which happened to have the same hash value.

This multi-column indexing structure can be employed for duplicate checking as described previously, where the unique key values comprise a multi-column value or tuple. For example, a query writing data having a multi-column unique key tuple is handled by hashing these keys and checking the upper index 135 for matches. For any matches, the corresponding lower indexes are checked for a match against the (not hashed) multi-column unique key values. Duplicate handling is then as previously described.

Figure 7:
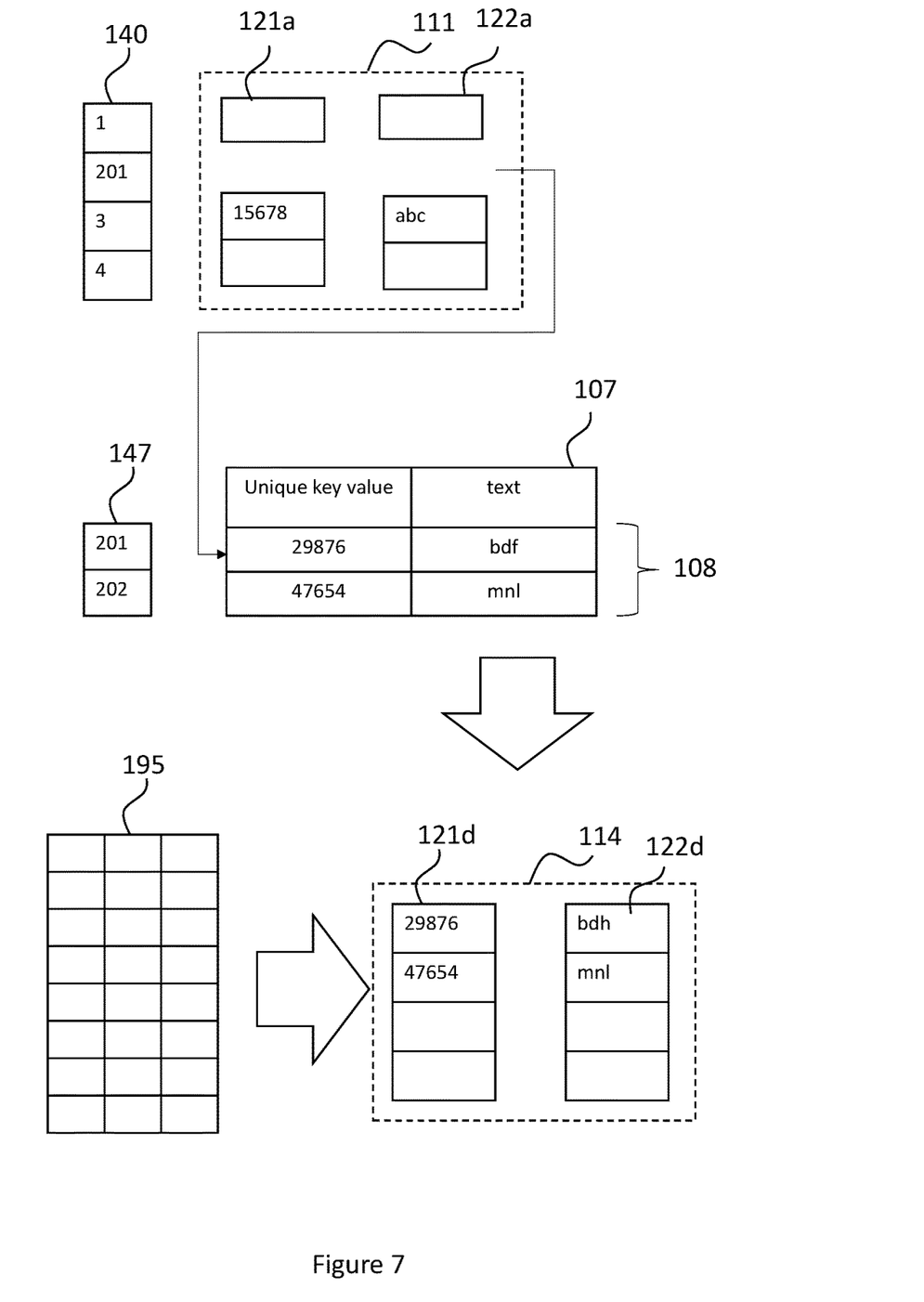
FIG. 7 is a schematic illustrating transfer of records between rowstore, columnstore and query batch, according to an example.

FIG. 7 illustrates the transfer of data to and from the columnstore. A record corresponding to position 2 in the row array index 140 of a segment 111 is moved from the columnstore to the rowstore 107. For example, data in non-unique key columns of the row may be amended in response to a query. In the example, this may correspond to a position 201 in a row index 147 of the rowstore 107. The row comprises the unique key value, in this example 29876, as well as one or more values for other columns in the table. The columnstore row moved to the rowstore may simply be deleted in the columnstore. Alternatively, array 140 may be updated to point to a position 201 in the rowstore row array 147 to indicate that the data at position 2 in the blobs 121a and 122a of this segment are no longer current. Further alternative arrangements are also possible, for example the corresponding positions in the blobs and/or lower indexes may be marked as "inactive" or similar.

The rowstore 107 may comprise multiple indexes, for example, more than one or each column of the rowstore 107 may correspond to at least one index. Having multiple indexes associated with the rowstore 107 improves the performance of a lookup by enabling fast seeking to rows within the rowstore 107 rather than scanning the entire rowstore 107.

When the rowstore 107 reaches a predetermined size 108, or some of the rows of the rowstore have not changed for a predetermined period, these rows may be written to the columnstore in a batch. As an example, a predetermined size threshold for the rowstore 200 may be 32 MB.

The previously described duplicate checking procedure may be employed to ensure no duplicate unique key values are written into the columnstore. A batch of data from a query 195 may additionally or alternatively be written to the columnstore, employing duplicate checking as previously described.

The batch of data 108, 195 is written as a new segment 114 in the columnstore, with blobs 121d, 122d corresponding to the columns of the batch data. After sorting the rows according to the sort key of the table, each column is encoded, compressed and written as a columnstore file or blob to the storage 175 on the node 170c. Together with this process, lower indexes are created for each blob written to the columnstore. The lower indexes may also be stored on the columnstore. Once the lower indexes for the blobs of the new segment 114 are written, an upper index for the new segment 114 is also created.

Figure 8:
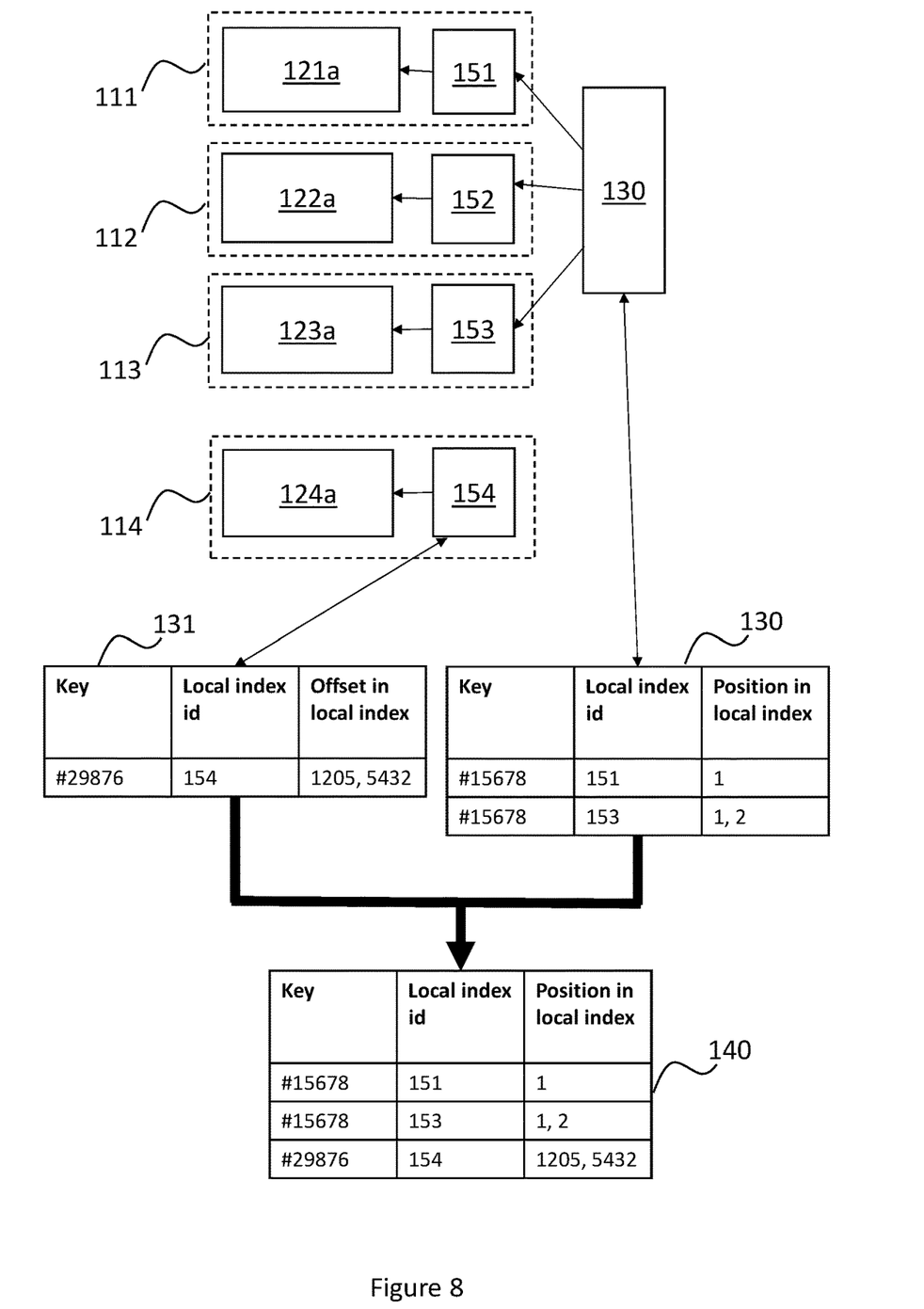
FIG. 8 is a schematic diagram illustrating merging of upper indexes, according to an example.

FIG. 8 illustrates a columnstore having four segments 111, 112, 113, and recently written segment 114. For simplicity only one column or blob 121a, 122a, 123a, 124a is shown, however it will be appreciated that the segments will include other blobs/columns. Each blob shown has a corresponding lower index 151, 152, 153 and 154. These include offsets within each blob for respective unique key values as previously described. One single upper index 130 points to lower indexes and respective positions within these lower indexes that correspond to unique key hash values. For example, the hash of unique key value 15678 (#15678) points to point 1 in lower index 151 and positions 1 and 2 in lower index 153. These lower indexes may then be checked for the existence of unique key value 15678 as previously described, for example for duplicate checking.

Another upper index 131 associated with newly written segment 114 points to the lower index 154 and position that corresponds to the hash of key 29876 (#29876). This may be used when checking for the existence of this unique key value in the columnstore by other processes such as subsequent write processes. Other write batches written to new segments will also have corresponding lower and upper indexes created at the time of writing the blobs to columnstore.

Over time these upper indexes can be merged in order to reduce their number. This reduces the time required for looking for a specific unique key value, including for duplicate checking when writing data to the database. Upper indexes 130 and 131 are illustrated as being merged into a single upper index 140 which comprises all entries of both previous upper indexes 130, 131. This merging may be performed when the number of upper indexes exceeds a threshold, or periodically.

In other examples, upper indexes may be merged based on their levels. This corresponds to a log-structured tree merge (LSM) arrangement for writing data to the columnstore. For example, a small upper index that may be related to one segment for example may only be merged with other upper indexes of a similar size (according to a pre-configured factor). Higher level or larger upper indexes such as 130 related to three segments 111, 112, 113 may only be merged with other similarly sized upper indexes that are considered at the same level. As upper indexes become part of higher-level upper indexes, these can then merge with other higher level upper indexes. This greatly enhances duplicate key checking performance by enabling a large number of segments (for example all those covered by one high-level upper index) in the columnstore to be searched by probing one upper index structure, instead of probing separate upper index structures corresponding to each segment.

Columnstore segments may themselves be merged from time to time as part of a background database maintenance procedure. In this case, the upper and lower indexes for the merged blobs will be created, with old upper and lower indexes marked for deletion. The upper indexes may also then be merged.

Whilst the above-described embodiments have been explained using specific examples, it will be appreciated that these examples are non-limiting and that alternative arrangements are possible.

The plurality of indexes may be exemplified by hash tables; dictionaries; B-trees; radix trees; and interval buckets. The use of hash tables for the upper index(es) provides speed or performance benefits. In an alternative arrangement the upper index may include actual unique key values rather than hashes of these. In this case the duplicate checking procedure simply needs to check the upper indexes for duplicates and does not also need to check lower indexes pointed to by the lower index identifier and location associated with common hash values.

The columnstore may be arranged with or without segments. Using per-segment lower indexes for each blob provides fast seeking to one or more rows of the columnstore 105 because scanning of entire segments is not required.

In the columnstore, the storage scheme or encoding of a column may define how many bits or bytes are assigned to storing each data item from a row of the segment 111 and is designed to be seekable. Other encoding schemes are possible for example storing an offset per row or an offset block per block of X rows. The offset array may then be used to seek quickly to the block containing the row. Accordingly, the offset value in the respective lower index 151, 153 is determined by determining a fixed number of bits or bytes assigned to data items from the rows preceding an identified row.

The database may be distributed across a plurality of nodes, for example using a shard key as previously described in which non-overlapping sets of rows of a table are split across the nodes. This helps distribute the query processing load to reduce the likelihood of one node becoming overloaded whilst the other nodes are lightly loaded. By including the shard key as part of the unique key, query data that may have a duplicate unique key value is sent to the same node so that duplicate checking does not require cross-checking between nodes.

In other embodiments, the table shard key may not be included as part of the unique key in which case a secondary table is built which is shared on the unique key. The secondary table has a unique key on unique key columns and may store row identifiers, using the primary key for example, which point to rows in the primary storage. When performing the unique key check for a batch, instead of checking locally, the rows are sent to the secondary table (cross-node communication) to perform the duplicate check where this is stored.

In the case of INSERT IGNORE/REPLACE/UPSERT queries, the result of the check for each row is returned to the primary storage or node so that the main write process can handle each case accordingly. In the case of REPLACE/INSERT, for any duplicates found the write process queries the remote nodes, using cross node communication, using the row identifiers from the duplicates found to delete those duplicated rows, and fetch the contexts of those rows to perform UPSERT.

In other embodiments at least some aspects of the embodiments described herein may comprise computer processes performed in processing systems or processors. However, in some examples, embodiments may also extend to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method of processing data to be written to a database, the data being associated with a unique key value, the method comprising:
    configuring, by a processor of a database management system, an upper index having hash values of unique key values contained in a columnstore in non-volatile storage used to store at least part of the database, the columnstore storing at least some data of the database in column-oriented columnstore files;
    configuring, by a processor of the database management system, a plurality of lower indexes each associated with a columnstore file and having a plurality of unique key values, each unique key value being associated with an offset within a respective columnstore file;
    determining, by a processor of the database management system, whether there is a duplicate in the database of the unique key value of the data to be written by:
    calculating a hash value of the unique key value of the data to be written to the database and storing the hash value in memory or non-volatile storage;
    querying the upper index for the stored hash value of the unique key value of the data to be written and, in response to the upper index having the stored hash value of the unique key value, identifying, from the upper index, a lower index of the plurality of lower indexes and a position within the identified lower index using the stored hash value; and
    querying the identified lower index using the position to determine whether a unique key value corresponding to the position in the identified lower index matches the unique key value of the data to be written, and
    processing, by a processor of the database management system, the data to be written to the database depending on the determination, the processing comprising:
    performing, by a processor of the database management system, duplicate unique key processing on the data to be written to the database in response to determining that there is a duplicate of the unique key value in the database, the duplicate unique key processing being dependent on whether a query accompanying the data to be written to the database is associated with INSERT IGNORE, wherein INSERT IGNORE instructs skipping the data to be written; and
    in response to determining that there is not a duplicate of the unique key value in the database:
    inserting, by a processor of the database management system, the data to be written to the database into the database;
    generating and storing, by a processor of the database management system, a lower index comprising the unique key value of the data to be written; and
    generating and storing, by a processor of the database management system, an upper index comprising the hash value of the unique key value of the data to be written.

2. The method according to claim 1, wherein the position within the identified lower index is associated with a location which stores the matching unique key value within the columnstore file associated with the identified lower index.

3. The method according to claim 2, wherein the unique key value of the data to be written is a unique key tuple and the upper index has hash values corresponding to unique key tuples, the method comprising:
    querying, by a processor of the database management system, the upper index to identify two or more lower indexes and respective positions within the lower indexes in response to the upper index having the stored hash value corresponding to the unique key tuple associated with the data to be written;
    querying, by a processor of the database management system, the identified lower indexes using the respective positions to determine whether a unique key value corresponding to the respective position matches a part of the unique key tuple; and
    checking, by a processor of the database management system, whether a combination of the matching unique key values corresponds to the unique key tuple of the data to be written.

4. The method according to claim 1, wherein the determining whether there is a duplicate unique key value comprises querying, by a processor of the database management system, a rowstore used to store at least part of the database to determine whether the rowstore has a unique key value matching the unique key value of the data to be written.

5. The method according to claim 1, wherein processing the data associated with the unique key value to be written to the database depending on the determination of whether there is a duplicate unique key value in the database further comprises:
    in response to a determination that there is a duplicate in the database of the unique key value of the data to be written, performing, by a processor of the database management system, one of the following: replacing, with the data to be written, data in the database associated with the unique key value; error processing; modify data in the database associated with the unique key value with the data to be written.

6. The method of claim 1, wherein the data to be written comprises a batch of a plurality of rows of data elements each associated with a unique key value and wherein determining whether there is a duplicate unique key value in the database is performed as a batch process in which querying the upper index comprises probing, by a processor of the database management system, for hash values associated with all unique key values of the data to be written and querying the lower index comprises probing all positions identified in the upper index.

7. The method according to claim 1, wherein the data to be written comprises a batch of a plurality of rows of data elements and the determining comprises querying, by a processor of the database management system, the batch to determine whether more than one row has a data element corresponding to the unique key value of the data to be written.

8. The method according to claim 7, in response to determining that more than one row has a data element corresponding to the unique key value of the data to be written, processing the data, by a processor of the database management system, according to one of the following:
- skipping all but the last row corresponding to the unique key value in response to a REPLACE operation;
- ignoring all but the first row corresponding to the unique key value in response to an INSERT IGNORE operation; or
- updating the last row corresponding to the unique key value using information from the previous rows in response to an UPSERT operation.

9. The method according to claim 1, wherein the data to be written comprises a batch comprising a plurality of rows of data elements, each row associated with a respective unique key value and the method comprising:
- writing, by a processor of the database management system, the data elements associated with the unique key values of at least some rows of the batch to the columnstore as a columnstore file;
- generating and storing, by a processor of the database management system, a lower index for the columnstore file, each unique key value in the lower index being associated with a respective position within the lower index; and
- generating and storing, by a processor of the database management system, an upper index having hash values corresponding to the unique key values of the batch and identifying a lower index corresponding to each stored hash value.

10. The method according to claim 9, comprising merging, by a processor of the database management system, two or more upper indexes.

11. The method according to claim 4, wherein the data to be written comprises a batch of a plurality of rows of data elements and the determining comprises:
- querying, by a processor of the database management system, the batch to determine whether more than one row has data items corresponding to the unique key value of the data to be written;
- marking, by a processor of the database management system, rows in the batch that have a duplicate unique key value in the database with skip or write marking depending on a received query; and
- writing, by a processor of the database management system, to the database the data of the or each row associated with a write marking.

12. The method according to claim 1, comprising:
- locking, by a processor of the database management system, unique key values in the columnstore corresponding to unique key values in the data to be written in order to prevent concurrent queries attempting to write data associated with the same unique key values;
- writing, by a processor of the database management system, the data into the database, and thereafter
- unlocking, by a processor of the database management system, the identified unique key values in the columnstore.

13. The method according to claim 1, wherein the columnstore is arranged into segments, each segment storing data elements from a plurality of non-overlapping rows of a table, the data elements being arranged into columns and each column of data elements being stored as a columnstore file, and wherein some columnstore files comprise unique key values for respective rows, the unique key values being associated with a respective lower index, and
- wherein querying the upper index comprises identifying by a processor of the database management system, for each segment, a said lower index and respective positions within said lower indexes.

14. The method according to claim 1, comprising:
- receiving, by a processor of the database management system, a query associated with data to be written; and
- forwarding, by a processor of the database management system, subsets of the data to be written to respective nodes of a distributed database system according to a shard key.

15. A non-transitory computer readable storage medium comprising computer-readable instructions which, when executed by a processor, cause the processor to:
- configure an upper index having hash values of unique key values contained in a columnstore in non-volatile storage used to store at least part of a database, the columnstore storing at least some data of the database in column-oriented columnstore files;
- configure a plurality of lower indexes each associated with a columnstore file and having a plurality of unique key values, each unique key value being associated with an offset within a respective columnstore file;
- process data to be written to the database, the data being associated with a unique key value, to determine whether there is a duplicate in the database of the unique key value of the data to be written by:
- calculating a hash value of the unique key value of the data to be written to the database and storing the hash value in memory or non-volatile storge;
- querying the upper index for the stored hash value of the unique key value of the data to be written and, in response to the upper index having the stored hash value of the unique key value, identifying, from the upper index, a lower index of the plurality of lower indexes and a position within the identified lower index using the stored hash value; and
- querying the identified lower index using the position to determine whether a unique key value corresponding to the position in the identified lower index matches the unique key value of the data to be written, and
- process the data to be written to the database depending on the determination, the processing comprising:
- performing, by the processor, duplicate unique key processing on the data to be written to the database in response to determining that there is a duplicate of the unique key value in the database, the duplicate unique key processing being dependent on whether a query accompanying the data to be written to the database is associated with INSERT IGNORE, wherein INSERT IGNORE instructs skipping the data to be written; and
- in response to determining that there is not a duplicate of the unique key value in the database;
- inserting, by the processor, the data to be written to the database into the database;
- generating and storing, by a processor of the database management system, a lower index comprising the unique key value of the data to be written; and
- generating and storing, by a processor of the database management system, an upper index comprising the hash value of the unique key value of the data to be written.

16. A database system for processing data to be written to a database, the data being associated with a unique key value, the database system comprising:
- at least one processor; and
- at least one memory including computer program code, the at least one memory and the computer program code being configured to, with the at least one processor, cause the database system to:
configure, using the at least one processor, an upper index having hash values of unique key values contained in a columnstore in non-volatile storage used to store at least part of the database, the columnstore storing at least some data of the database in column-oriented columnstore files;
configure, using the at least one processor, a plurality of lower indexes each associated with a columnstore file and having a plurality of unique key values, each unique key value being associated with an offset within a respective columnstore file;
determine, using the at least one processor, whether there is a duplicate in the database of the unique key value of the data to be written by being configured to:
calculate a hash value of the unique key value to be written to the database and store the hash value in memory or non-volatile storage;
query the upper index for the stored hash value of the unique key value of the data to be written and, in response to the upper index having the stored hash value corresponding to the unique key value, identifying, from the upper index, a lower index of the plurality of lower indexes and a position within the identified lower index using the stored hash value; and
query the identified lower index using the position to determine whether a unique key value corresponding to the position in the identified lower index matches the unique key value of the data to be written, and
process, using the at least one processor, the data to be written to the database depending on the determination, the processing comprising:
performing, by the at least one processor, duplicate unique key processing on the data to be written to the database in response to determining that there is a duplicate of the unique key value in the database, the duplicate unique key processing being dependent on whether a query accompanying the data to be written to the database is associated with INSERT IGNORE, wherein INSERT IGNORE instructs skipping the data to be written; and
in response to determining that there is not a duplicate of the unique key value in the database;
inserting, by the at least one processor, the data to be written to the database into the database;
generating and storing, by a processor of the database management system, a lower index comprising the unique key value of the data to be written; and
generating and storing, by a processor of the database management system, an upper index comprising the hash value of the unique key value of the data to be written.

* * * * *